US009083789B2

(12) United States Patent

Dicke et al.

(10) Patent No.: US 9,083,789 B2

(45) Date of Patent: Jul. 14, 2015

(54) METHODS AND APPARATUS FOR ASSOCIATING MAPPING FUNCTIONALITY AND INFORMATION IN CONTACT LISTS OF MOBILE COMMUNICATION DEVICES

(75) Inventors: Ronald Anthony Dicke, Ottawa (CA); Nicholas Bryson Wilson, Kanata (CA); Jesse Joseph Boudreau, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/348,814

(22) Filed: Jan. 12, 2012

(65) Prior Publication Data

US 2012/0149401 A1 Jun. 14, 2012

Related U.S. Application Data

(63) Continuation of application No. 11/693,953, filed on Mar. 30, 2007, now Pat. No. 8,121,610, which is a (Continued)

(51) Int. Cl.

| | |
|---|---|
| ***H04W 24/00*** | (2009.01) |
| ***G08G 1/123*** | (2006.01) |

(Continued)

(52) U.S. Cl.

CPC ......... *H04M 1/27455* (2013.01); *G01C 21/362* (2013.01); *G01C 21/3682* (2013.01);

(Continued)

(58) Field of Classification Search

CPC .. G01C 21/362; G01C 21/3682; G06Q 10/10; H04M 1/72522; H04M 2250/10

USPC ............... 455/456.1, 414, 415, 457; 701/208, 701/211, 200, 357.21, 357.22; 340/995.1, 340/998; 341/50; 342/357.09, 357.1, 342/357.21, 357.22

See application file for complete search history.

(56) References Cited

U.S. PATENT DOCUMENTS

| | | | |
|---|---|---|---|
| 4,914,605 | A | 4/1990 | Loughmiller, Jr. et al. |
| 5,289,572 | A | 2/1994 | Yano et al. |

(Continued)

FOREIGN PATENT DOCUMENTS

| | | |
|---|---|---|
| EP | 0875729 A2 | 4/1998 |
| EP | 0908835 A2 | 4/1999 |

(Continued)

OTHER PUBLICATIONS

European Search Report for EP Patent Application 06116846.4-2213, Date Oct. 12, 2006.

(Continued)

*Primary Examiner* — Opiribo Georgewill

(74) *Attorney, Agent, or Firm* — Jeffrey N. Giunta; Fleit Gibbons Gutman Bongini & Bianco P.L.

(57) ABSTRACT

A mobile communication device stores a contact list which includes a plurality of contacts, and identifies a user selection to map a location of a selected contact. In response, the device reads an address from an address field of the selected contact, sends to an address geocoding server the address with a request for latitude and longitude coordinates, and receives from the address geocoding server the coordinates. When map rendering data corresponding to the coordinates is cached in memory, the device renders a map based on the map rendering data. Otherwise, the device sends to a map server the coordinates with a request for context-filtered map data, which is based at least in part on a user context independent of the location of the device. The device receives the context-filtered map data, and renders a map based on the received context-filtered map data.

17 Claims, 13 Drawing Sheets

Related U.S. Application Data continuation-in-part of application No. 11/483,124, filed on Jul. 7, 2006.

(60) Provisional application No. 60/788,458, filed on Mar. 31, 2006, provisional application No. 60/787,541, filed on Mar. 31, 2006.

(51) Int. Cl.

| | |
|---|---|
| ***G01S 19/38*** | (2010.01) |
| ***G01S 19/39*** | (2010.01) |
| ***H04M 1/2745*** | (2006.01) |
| ***G01C 21/36*** | (2006.01) |
| ***G06Q 10/10*** | (2012.01) |
| ***H04M 1/725*** | (2006.01) |

(52) U.S. Cl.

CPC ............. *G06Q10/10* (2013.01); *H04M 1/2745* (2013.01); *H04M 1/72522* (2013.01); *H04M 1/72544* (2013.01); *H04M 2250/10* (2013.01)

(56) References Cited

U.S. PATENT DOCUMENTS

| | | | |
|---|---|---|---|
| 5,559,938 | A | 9/1996 | Van Roekel et al. |
| 5,901,222 | A | 5/1999 | Macor |
| 6,240,360 | B1 | 5/2001 | Phelan |
| 6,278,940 | B1 | 8/2001 | Endo |
| 6,288,704 | B1 | 9/2001 | Flack et al. |
| 6,493,630 | B2 | 12/2002 | Ruiz et al. |
| 6,553,308 | B1 * | 4/2003 | Uhlmann et al. ............. 701/455 |
| 6,570,596 | B2 | 5/2003 | Frederiksen |
| 6,664,989 | B1 | 12/2003 | Snyder et al. |
| 6,683,626 | B1 | 1/2004 | Abellera |
| 6,703,947 | B1 * | 3/2004 | Wallner .......................... 341/50 |
| 6,965,675 | B1 | 11/2005 | Trimberger et al. |
| 7,065,348 | B1 | 6/2006 | Aoki |
| 7,089,507 | B2 | 8/2006 | Lection et al. |
| 7,096,118 | B2 | 8/2006 | Cochlovius et al. |
| 7,158,878 | B2 | 1/2007 | Rasmussen et al. |
| 7,200,112 | B2 | 4/2007 | Sundar et al. |
| 7,383,316 | B2 | 6/2008 | Koch et al. |
| 7,450,003 | B2 | 11/2008 | Weber et al. |
| 7,606,663 | B2 | 10/2009 | Neef et al. |
| 7,933,609 | B2 | 4/2011 | Lagerstedt et al. |
| 8,045,980 | B2 | 10/2011 | Buckley et al. |
| 8,121,610 | B2 | 2/2012 | Dicke et al. |
| 8,244,279 | B2 | 8/2012 | Dicke et al. |
| 8,254,985 | B2 | 8/2012 | Ekicl et al. |
| 2001/0036844 | A1 | 11/2001 | Ishigaki |
| 2002/0032521 | A1 | 3/2002 | Machii et al. |
| 2002/0041328 | A1 | 4/2002 | Le Compte et al. |
| 2002/0174360 | A1 | 11/2002 | Ikeda |
| 2003/0142641 | A1 | 7/2003 | Sumner et al. |
| 2003/0182052 | A1 | 9/2003 | DeLorme et al. |
| 2003/0184594 | A1 | 10/2003 | Ellenby et al. |
| 2003/0229441 | A1 | 12/2003 | Pechatnikov et al. |
| 2004/0030493 | A1 | 2/2004 | Pechatnikov et al. |
| 2004/0167706 | A1 | 8/2004 | Becker |
| 2004/0209601 | A1 | 10/2004 | Obradovich et al. |
| 2004/0257340 | A1 | 12/2004 | Jawerth |
| 2005/0032527 | A1 * | 2/2005 | Sheha et al. ............... 455/456.1 |
| 2005/0033511 | A1 | 2/2005 | Pechatnikov et al. |
| 2005/0097189 | A1 | 5/2005 | Kashi |
| 2005/0114021 | A1 * | 5/2005 | Krull et al. .................... 701/211 |
| 2005/0182767 | A1 | 8/2005 | Shoemaker et al. |
| 2006/0015819 | A1 | 1/2006 | Hawkins et al. |
| 2006/0058953 | A1 * | 3/2006 | Cooper et al. ................ 701/208 |
| 2006/0084477 | A1 | 4/2006 | Wardimon et al. |
| 2006/0190833 | A1 | 8/2006 | SanGiovanni et al. |
| 2006/0223518 | A1 | 10/2006 | Haney |
| 2006/0241860 | A1 | 10/2006 | Kimchi et al. |
| 2006/0242605 | A1 | 10/2006 | Kim et al. |
| 2006/0284765 | A1 * | 12/2006 | Bernhardt et al. ....... 342/357.09 |
| 2007/0178915 | A1 | 8/2007 | Khan |
| 2008/0033903 | A1 * | 2/2008 | Carol et al. ....................... 707/1 |
| 2008/0176545 | A1 | 7/2008 | Dicke et al. |
| 2011/0299422 | A1 | 12/2011 | Kim et al. |

FOREIGN PATENT DOCUMENTS

| | | | |
|---|---|---|---|
| EP | 1464922 | A1 | 10/2004 |
| EP | 1477911 | A | 11/2004 |
| EP | 1710713 | A1 | 10/2006 |
| JP | 2005301196 | | 10/2005 |
| KR | 10200050071950 | A | 7/2005 |
| WO | 8602764 | A1 | 5/1986 |
| WO | 9707467 | A1 | 2/1997 |
| WO | 0127812 | A2 | 4/2001 |
| WO | 0165518 | A | 9/2001 |
| WO | 03087725 | A2 | 9/2003 |
| WO | 2004076977 | A1 | 9/2004 |
| WO | WO 2004076977 | A1 * | 9/2004 |

OTHER PUBLICATIONS

Office Action for Korean Patent Application 10-2007-0032470, dated Oct. 27, 2008.

Camara et al., “Location Based Services for WAP Phone Users in a Shopping Center”, Applied GIS and Spatial Analysis, Dec. 2003, John Wiley and Sons Ltd, pp. 62-64.

Australian Office Action dated Feb. 17, 2014, in Australian Patent Application No. 2013206122.

* cited by examiner

Address View — 222

Bob Paillard — 802
Company: Company, Inc.
Title:
Email: rpaillard@company.com — 810

P/N: xxxxxxxx
Work: +1-555-555-1212 — 804
Home: +1-555-555-1212 — 805

Work Address: — 806
450 March Road
Kanata, ON
Canada K1Y 0S4

Home Address: — 808
5'6 Athlone Avenue
Ottawa, ON
Canada K1Y 2V2

800

METHODS AND APPARATUS FOR ASSOCIATING MAPPING FUNCTIONALITY AND INFORMATION IN CONTACT LISTS OF MOBILE COMMUNICATION DEVICES

CROSS-REFERENCE TO RELATED APPLICATIONS

This application is a continuation of and claims priority to U.S. non-provisional patent application having application Ser. No. 11/693,953 and filing date of 30 Mar. 2007, now U.S. Pat. No. 8,121,610, which is a continuation-in-part of and claims priority to U.S. non-provisional patent application having application Ser. No. 11/483,124 and filing date of 7 Jul. 2006, which claims priority to U.S. provisional patent application having application No. 60/788,458 and filing date of 31 Mar. 2006 and U.S. provisional patent application having application No. 60/787,541 and filing date of 31 Mar. 2006.

BACKGROUND

1. Field of the Technology

The present disclosure relates generally to mapping functionality and techniques which are suitable for use in mobile communication devices operating in wireless communication networks.

2. Description of the Related Art

A mobile communication device may provide a contact organizer function for use in organizing a plurality of contacts in a contact list for an end user. The contact organizer function may be an address book organizer function, for example, where each contact of the plurality of contacts includes a name and associated contact information such as an address, one or more telephone numbers, and an electronic mail (e-mail) address. Some of the contact information, such as the telephone number and e-mail address, may be utilized when communications are initiated from the mobile communication device by the end user.

Increasingly, mobile communication devices are also provided with mapping functionality for presenting visually displayed maps of geographic locations. However, there has been no known useful integration of such contact organizer functionality and mapping functionality in mobile communication devices.

Accordingly, there is a need for methods and apparatus for associating mapping functionality and information with contact list functionality and information, especially in mobile communication devices which operate in wireless communication networks.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

In one illustrative example of techniques of the present disclosure, a method of associating mapping functionality in a contact list of a mobile communication device comprises the acts of providing a contact list organizer function in the mobile communication device for use in organizing a plurality of contacts of a contact book or list; identifying, through a user interface of the mobile communication device, a user input request to map a location of a selected one of the contacts of the contact list; and in response to the user input request, performing the following further acts of identifying an address of the location in one or more address fields of the selected contact; sending, to an address geocoding server via wireless network, a request for location coordinates with the address as an input; receiving, via the wireless network, latitude and longitude coordinates of the location in response to the request for the location coordinates; and causing a map corresponding to the location of the selected contact to be visually rendered in a display of the mobile device based on map rendering data for the location corresponding to the latitude and longitude coordinates received via the wireless network in response to a request for map data of the location.

Figure 1:
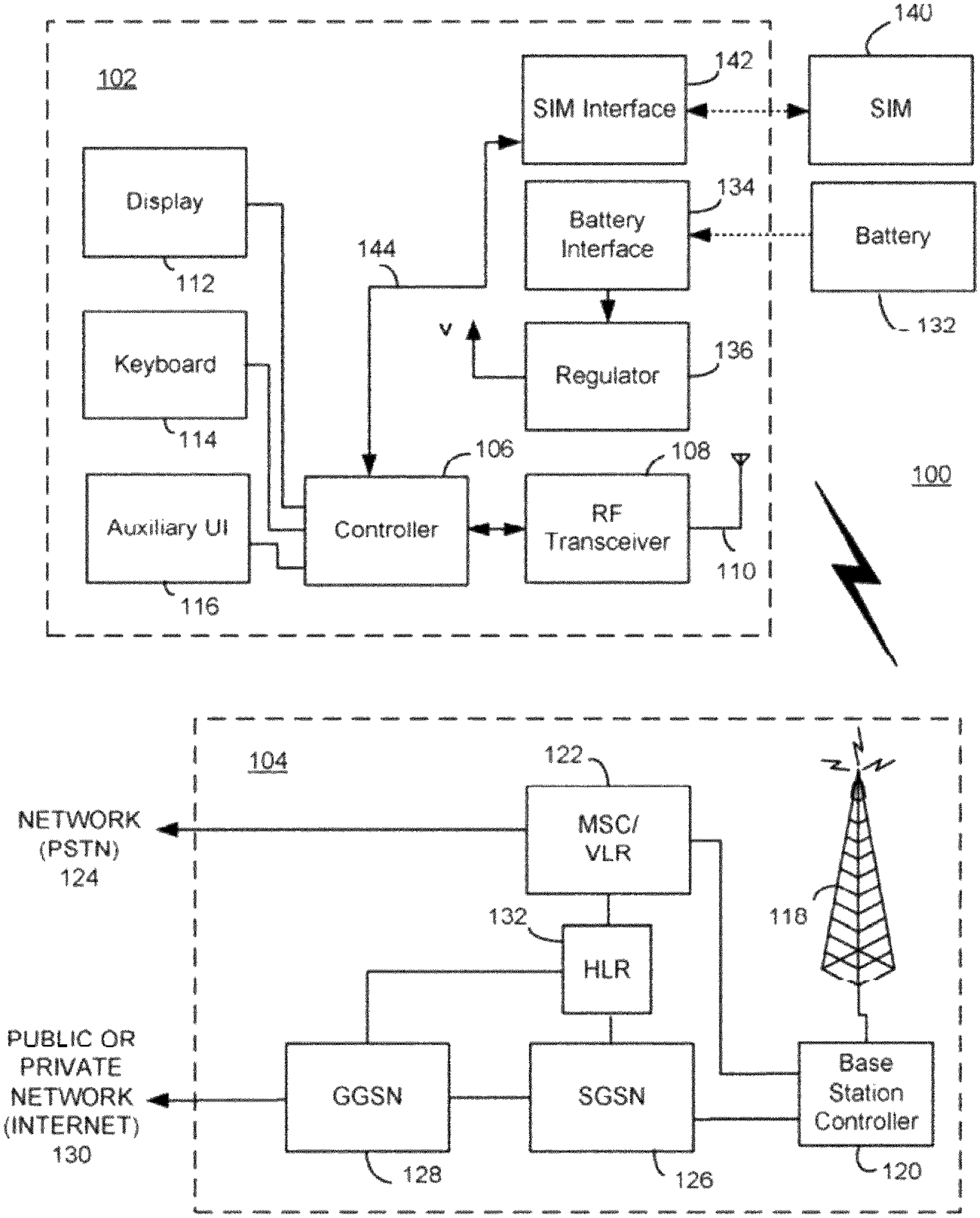
FIG. 1 is a block diagram which illustrates pertinent components of a mobile communication device and a wireless communication network of a communication system.

FIG. 1 is a block diagram of a communication system 100 which includes a mobile station 102 (one type of wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 134 provides for a mechanical and electrical connection for battery 132. Battery interface 134 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a Global Positioning System (GPS) unit, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. Wireless communication network 104 may be a cellular telecommunications network. In the embodiment of FIG. 1, wireless network 104 is configured in accordance with Global Systems for Mobile Communications (GSM) and General Packet Radio Service (GPRS) technologies. Although wireless communication network 104 is described herein as a GSM/GPRS type network, any suitable network technologies may be utilized such as Code Division Multiple Access (CDMA), Wideband CDMA (WCDMA), whether 2G, 3G, or Universal Mobile Telecommunication System (UMTS) based technologies. In this embodiment, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
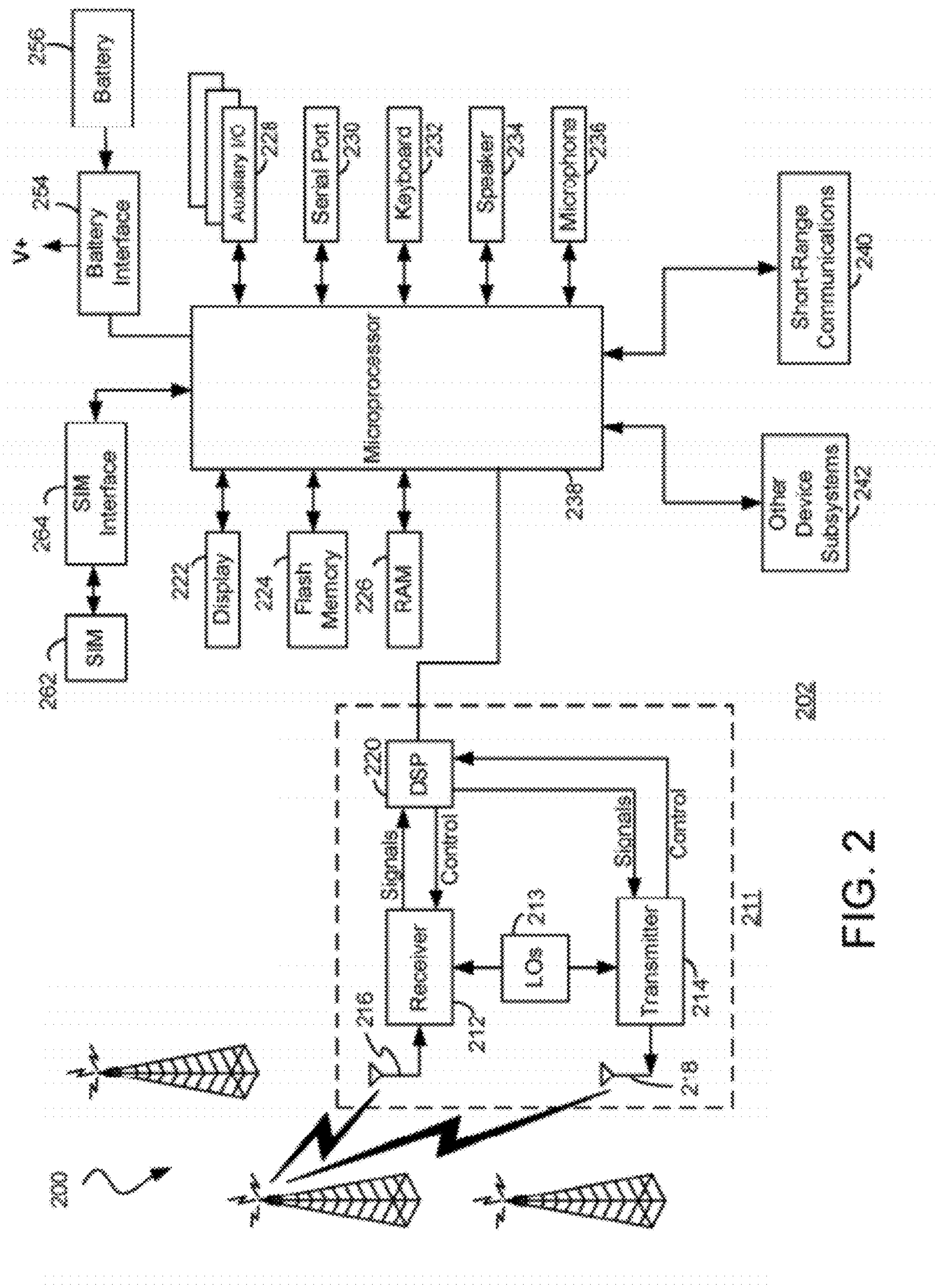
FIG. 2 is a more detailed diagram of a preferred mobile communication device of FIG. 1, namely, a mobile station.

FIG. 2 is a detailed block diagram of a preferred mobile station 202 of the present disclosure. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as the inventive functionality of the present disclosure, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3A:
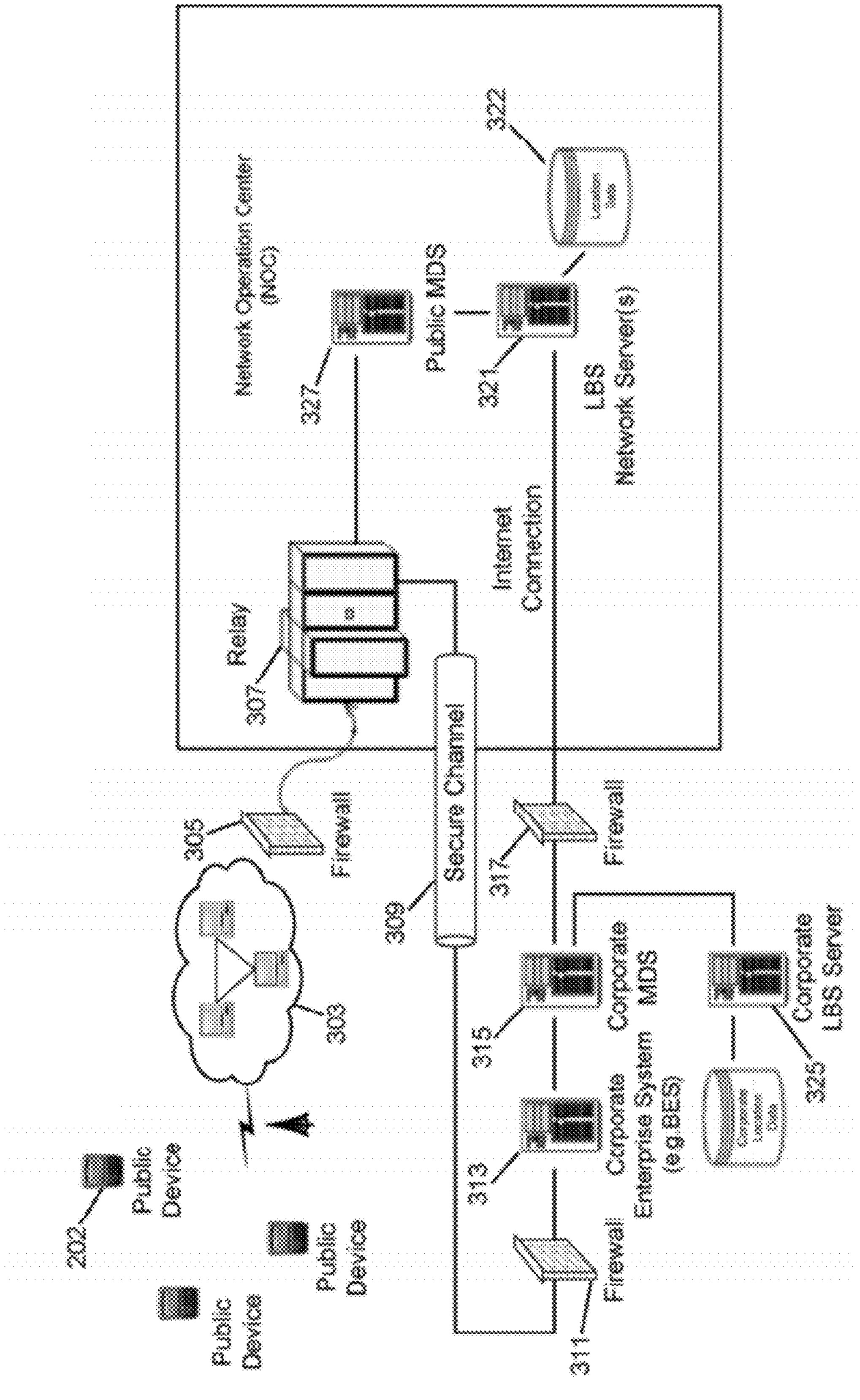
FIG. 3A is a system diagram of network components which provide mapping functionality in the mobile communication devices of FIGS. 1 and 2.

FIG. 3A is a system diagram of network components which provide mapping functionality in the mobile communication devices of FIGS. 1 and 2. To achieve this, a mapping application is also provided in memory of the mobile communication device (e.g. a mapping application 550 of FIG. 5) for rendering of visual maps in its display. Mobile communication devices, such as mobile station 202, are connected over a mobile carrier network 303 for communication through a firewall 305 to a relay 307. A request for map data from any one of the mobile communication devices is received at relay 307 and passed via a secure channel 309 through firewall 311 to a corporate enterprise server 313 and corporate mobile data system (MDS) server 315. The request is then passed via firewall 317 to a public location-based service (LBS) server 321 which provides location-based services (LBS) to handle the request. The network may include a plurality of such LBS servers where requests are distributed and processed through a load distributing server. The LBS data may be stored on this network server 321 in a network database 322, or may be stored on a separate LBS data server (not shown). Private corporate data stored on corporate LBS server 325 may be added to the public data via corporate MDS server 315 on the secure return path to mobile station 202. Alternatively, where no corporate servers provided, the request from mobile station 202 may be passed via relay 307 to a public MDS server 327, which sends the request to public LBS server 321 providing LBS to handle the request.

The network may also include an address geocoding server (not shown in FIG. 3A) which provides latitude and longitude coordinates corresponding to an address (e.g. a residential home or business address) in response to a request for latitude and longitude coordinates with the address as an input. The address geocoding server is preferably a server that is separate and apart from LBS server 321 which provides map data for rending maps. The address geocoding server may be provided in the same network as LBS server 321 or, alternatively, in a different network.

A Maplet data structure is provided that contains all of the graphic and labeled content associated with a geographic area (e.g. map features such as restaurants (point features), streets (line features), or lakes (polygon features)). Maplets are structured in Layers of "DEntries" (Data Entries) identified by a "Layer ID" to enable data from different sources to be deployed to the device and meshed for proper rendering. Each DEntry is representative of one or more artifact or label (or a combination of both) and includes coordinate information (also referred to a "bounding box" or "bounding area") to identify the area covered by the DEntry and a plurality of data Points that together represent the artifact or label. For example, a DEntry may be used to represent a street on a city map (or a plurality of streets), wherein the various Points within the DEntry are separated into different parts representing various portions of the artifact (e.g. portions of a street). A mobile device may issue a request for the map server to download only those DEntries that are included within a specified area or bounding box representing an area of interest that can be represented by, for example, a pair of bottom left, top right coordinates.

As discussed later below with reference to FIG. 3B, the mobile device issues one or more AOI (Area of Interest) requests, DEntry or data requests and Maplet Index requests to the map server, for selective downloading of map data based on user context Thus, rather than transmitting the entire map data with each request from the device, local caching may be used within the mobile device in conjunction with context filtering of map data on the server. For example, if a user's mobile device is GPS enabled and the user is traveling in an automobile at 120 km/hr along a freeway then context filtering can be employed to prevent downloading of map data relating to passing side streets. Or, if the user is traveling in an airplane at 30,000' then context filtering can be employed to prevent downloading of map data for any streets whatsoever. Also, a user's context can be defined, for example, in terms of occupation (e.g. a user whose occupation is transport truck driver can employ context filtering to prevent downloading of map data for side streets on which the user's truck is incapable of traveling, or a user whose occupation is to replenish supplies of soft drink dispensing machines can employ context filtering to download public map data showing the user's geographical area of responsibility with irrelevant features such as lakes or parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data Points. Consequently, the Maplet Index is small (e.g. 300-400 bytes) relative to the size of a fully populated Maplet or a conventional bit map, and includes DEntry bounding boxes and attributes (size, complexity, etc.) for all artifacts within the Maplet. As the field of view changes (e.g. for a location-aware device that displays a map while moving), the device (client) software assesses whether or not it needs to download additional data from the server. Thus, as discussed above, if the size attribute or complexity attribute of an artifact that has started to move into the field of view of the device (but is not yet being displayed) is not relevant to the viewer's current context, then the device can choose not to display that portion of the artifact. On the other hand, if the portion of the artifact is appropriate for display then the device accesses its cache to determine whether the DEntries associated with that portion of the artifact have already been downloaded, in which case the cached content is displayed. Otherwise, the device issues a request for the map server to download all of the DEntries associated with the artifact portion.

By organizing the Maplet data structure in Layers, it is possible to seamlessly combine and display information obtained from public and private databases. For example, it is possible for the device to display an office building at a certain address on a street (e.g. $1^{st}$ z-order attribute from public database), adjacent a river (e.g. $2^{nd}$ z-order attribute from public database), with a superimposed floor plan of the building to show individual offices (e.g. $11^{th}$ z-order attribute from a private database, accessible through a firewall).

Referring back to FIG. 3A, within the network having LBS server(s) 321 and database(s) 322 accessible to it, all of the map data for the entire world is divided and stored as a grid according to various levels of resolution (zoom), as set forth below in Table A. Thus, a single A level Maplet represents a 0.05×0.05 degree grid area; a single B level Maplet represents a 0.5×0.5 degree grid area; a single C level Maplet represents a 5×5 degree grid area; a single D level Maplet represents a 50×50 degree grid area and a single E level Maplet represents the entire world in a single Maplet. It is understood that Table A is only an example of a particular Maplet grid configuration; other or different grid configurations may also be developed. A Maplet comprises of a set of layers, with each layer containing a set of DEntries, and each DEntry containing a set of points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

Figure 3B:
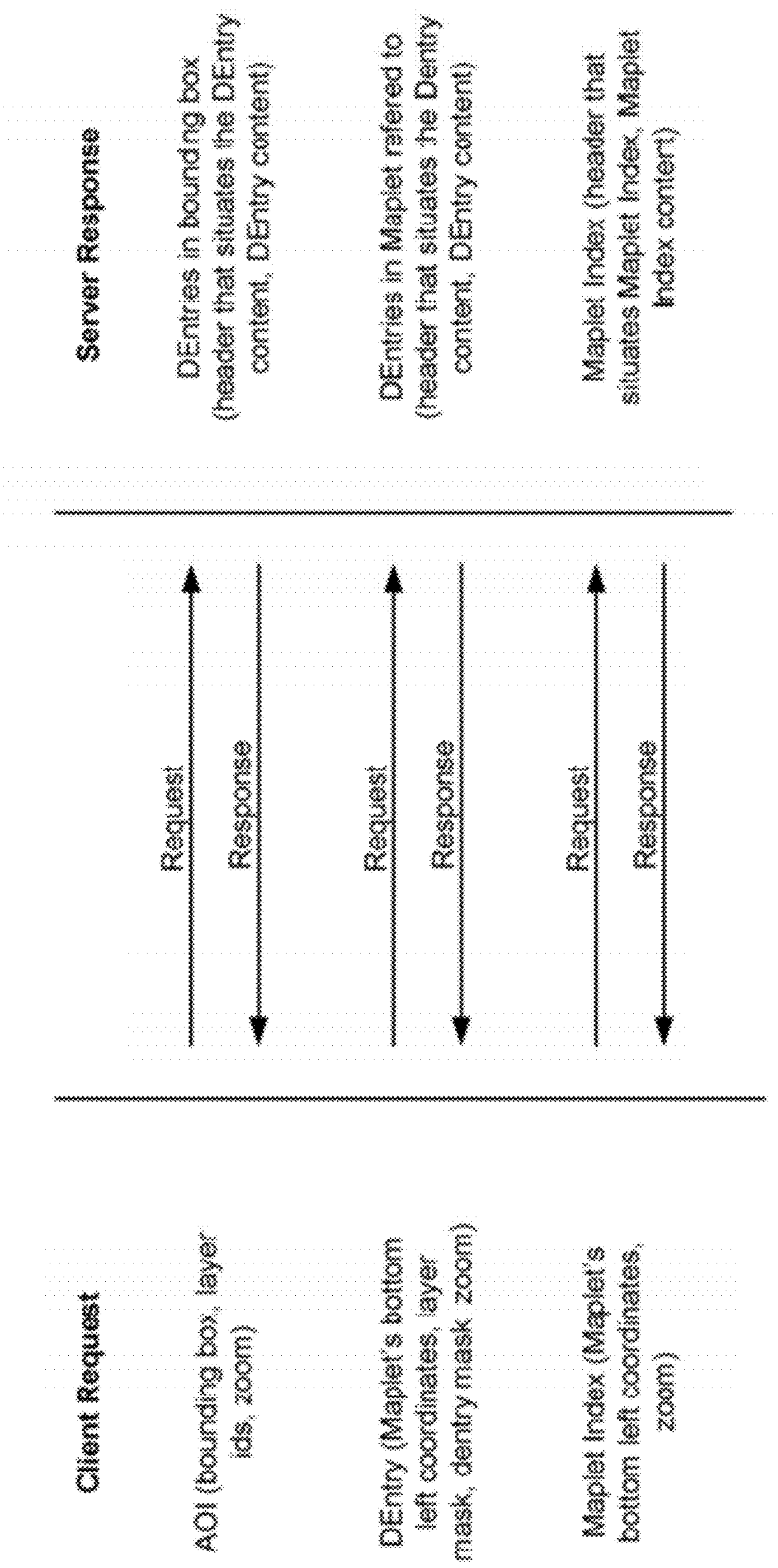
FIG. 3B illustrates a message exchange between a mobile communication device and a map server for downloading map content to the mobile communication device based on the system of FIG. 3A.

Turning now to FIG. 3B, three specific types of requests may be generated by a mobile communication device (i.e. the client)—AOI requests, DEntry requests, and Maplet Index requests. The requests may be generated separately or in various combinations, as discussed in greater detail below. An AOI (area of interest) request calls for all DEntries in a given area (bounding box) for a predetermined or selected set of z-order layers. The AOI request is usually generated when the mobile communication device moves to a new area so as to fetch Dentries for display before the device client knows what is available in the Maplet. The Maplet Index has the exact same structure as a Maplet but does not contain complete DEntries (i.e. the data Points that actually represent artifacts and labels are omitted). Thus, a Maplet Index defines what layers and DEntries are available for a given Maplet. A data or DEntry request is a mechanism to bundle together all of the required DEntries for a given Maplet.

Typically, AOI and Maplet Index requests are paired together in the same message, although they need not be, while DEntry requests are generated most often. For example, when the mobile communication device moves into an area in connection with which no information has been stored on the device client, the Maplet Index request returns a Maplet Index that indicates what data the client can specifically request from the server 321, while the AOI request returns any DEntries within the area of interest for the specified layers (if they exist). In the example requests shown in FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

According to the present disclosure herein, a collection of 20×20 A-level Maplets (representing a 1×1 degree square) is compiled into a Maplet file (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
|---|---|---|
| 0x000 | Maplet # 0 Offset (4 bytes) | Maplet # 0 Length (4 bytes) |
| 0x008 | Maplet # 1 Offset | Maplet # 1 Length |
| 0x010 | Maplet # 2 Offset | Maplet # 2 Length |
| . . . | . . . | . . . |
| 0xC78 | Maplet # 399 Offset | Maplet # 399 Length |
| 0xC80 | Beginning of Maplet # 0 | |
| 0xC80 + Size of Maplet # 0 | Beginning of Maplet # 1 | |
| 0xC80 + Size of Maplet # 0 + # 1 | Beginning of Maplet # 2 | |
| . . . | . . . | |
| 0xC80 + Σ of Size of Maplets (# 0: # 398) | Beginning of Maplet # 399 | |

In Table B, the offset of Maplet #0 is 0x0000_0000 since, according to the present disclosure, the data structure is based on the assumption that the base address for the actual Maplet data is 0x0000_0080. Therefore the absolute address for Maplet #0 data is: Maplet #0 Address=Base Address (0x0000_0080)+Maplet #0 Offset (0x0000_0000), and additional Maplet addresses are calculated as: Maplet # (n+1) Offset=Maplet # (n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index # 0 Offset | Maplet Index # 0 Length |
| 0x008 | Maplet Index # 1 Offset | Maplet Index # 1 Length |
| 0x010 | Maplet Index # 2 Offset | Maplet Index # 2 Length |
| . . . | . . . | . . . |
| 0xC78 | Maplet Index # 399 Offset | Maplet Index # 399 Length |
| 0xC80 | Beginning of Maplet Index # 0 | |
| 0xC80 + Size of Maplet Index # 0 | Beginning of Maplet Index # 1 | |
| 0xC80 + Size of Maplet Index # 0 + # 1 | Beginning of Maplet Index # 2 | |
| . . . | . . . | |
| 0xC80 + Σ of Size of Maplet Indices (# 0: # 399) | Beginning of Maplet Index # 399 | |

In Table C, the offset of Maplet Index #0 is 0x0000_0000 since, according to the present disclosure the data structure is based on the assumption that the base address for the actual Maplet index data is 0x0000_0080. Therefore the absolute address for Maplet Index #0 data is: Maplet Index #0 Address=Base Address (0x0000_0080)+Maplet Index #0 Offset (0x0000_0000), and additional Maplet index addresses are calculated as: Maplet Index # (n+1) Offset=Maplet Index # (n) Offset+Maplet Index #(n) Length. If a Maplet Index has no data or does not exist, the length parameter is set to zero (0x0000_0000).

Figure 3C:
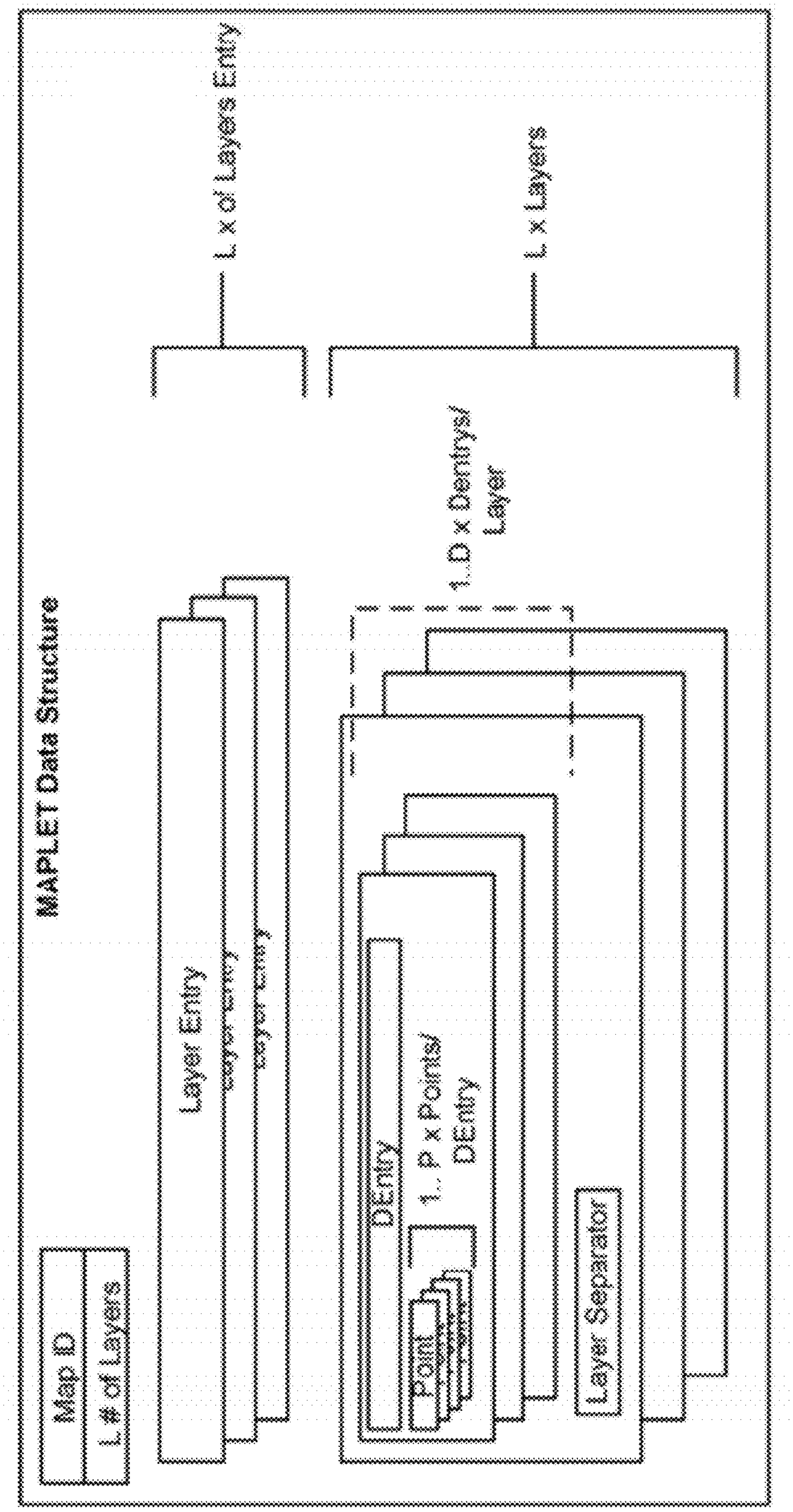
FIG. 3C is a diagram showing a Maplet data structure according to an exemplary embodiment.

FIG. 3C and Table D below, in combination, illustrate an exemplary embodiment of a basic Maplet data structure. Generally, as noted above, the Maplet data structure can be said to include a Maplet Index (i.e. an index of the DEntries, each of which representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes for all DEntries in the corresponding Layer and is followed by a list of DEntries for that Layer. The above forms a Maplet Index. For a complete Maplet, each DEntry contains a set of data Points (referred to herein as oPoints) or Labels). Note that Layers may have multiple DEntries and the complete list of DEntrys and Points are grouped by Layer and separated by a Layer Separator (e.g. hex value 0xEEEEEEEE). According to an exemplary embodiment, each Layer Entry is 20 bytes long, and a DEntry is 12 bytes long. However, the number of Layers, number of DEntries per Layer and the number of Points per DEntry depends on the map data and is variable.

Table D provides a high "byte-level" description of a Maplet.

TABLE D

| Data | | Quantity | Total # of Bytes |
|---|---|---|---|
| Map ID | | 1 | 4 bytes |
| # of Layers | | 1 | 4 bytes |
| Layer Entrys | | # of Layers | 20 bytes × (# of Layers) |
| DEntry of a Layer | x (# of DEntries in a Layer) | # of Layers | 12 bytes × (Σ of the # of DEntrys in each Layer) + |
| Points for DEntry of a Layer | | | 4 bytes × (Σ of the # of Points in each DEntry in each Layer) + |
| Layer Separator | | | 4 bytes × (# of Layers) |

For even greater detail if desired, this application hereby incorporates by reference herein a U.S. provisional patent application entitled "Method And System For Distribution Of Map Content To Mobile Communication Devices" having Ser. No. 60/787,541, lead inventor Eric Johnson, and a filing date of 31 Mar. 2006.

Figure 4:
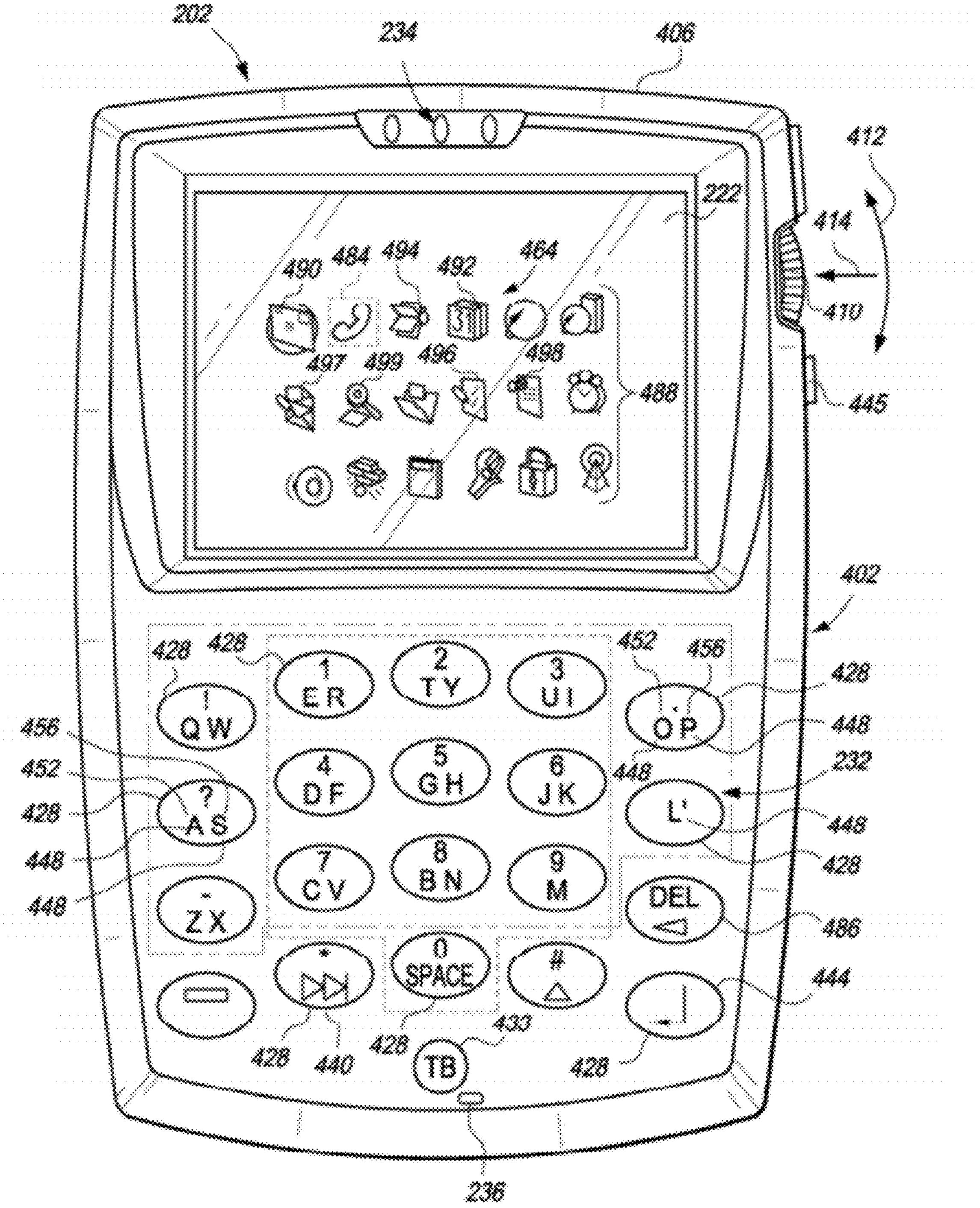
FIG. 4 is an illustration of a user interface of the mobile communication device.

FIG. 4 is an example of a user interface 402 of mobile station 202 which includes at least display 222, keyboard 232, speaker 234, microphone 236, and a cursor or view positioning mechanism such as a positioning wheel 410 (e.g. a scroll-wheel wheel) or a trackball 433. Although shown enlarged in FIG. 4 for clarity, this mobile station 202 is sized to be a handheld portable device. As an alternative to or in addition to positioning wheel 410 and/or trackball 433, a wide range of one or more pointing or cursor/view positioning mechanisms such as a touch pad a joystick button, a mouse, a touchscreen, a tablet, or other whether presently known or unknown, may be employed. As employed herein, the term "cursor" shall expressly include, but not be limited by, a pointer, a movable item or other visual cue (e.g., without limitation, a graphical object; a special symbol; an outline; a rectangle; an underline character; a blinking item) used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. It is understood that the expression "characters" shall broadly be construed to include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, whether presently known or unknown, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor. Positioning wheel 410 will be described in more detail in relation to FIGS. 6 and 7 below.

Display 222 may include a cursor 484 that depicts generally where the next input or selection from user interface 402 will be received. Display 222 is shown in FIG. 4 as displaying a home screen that represents a number of applications 586 (see also FIG. 5 which shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
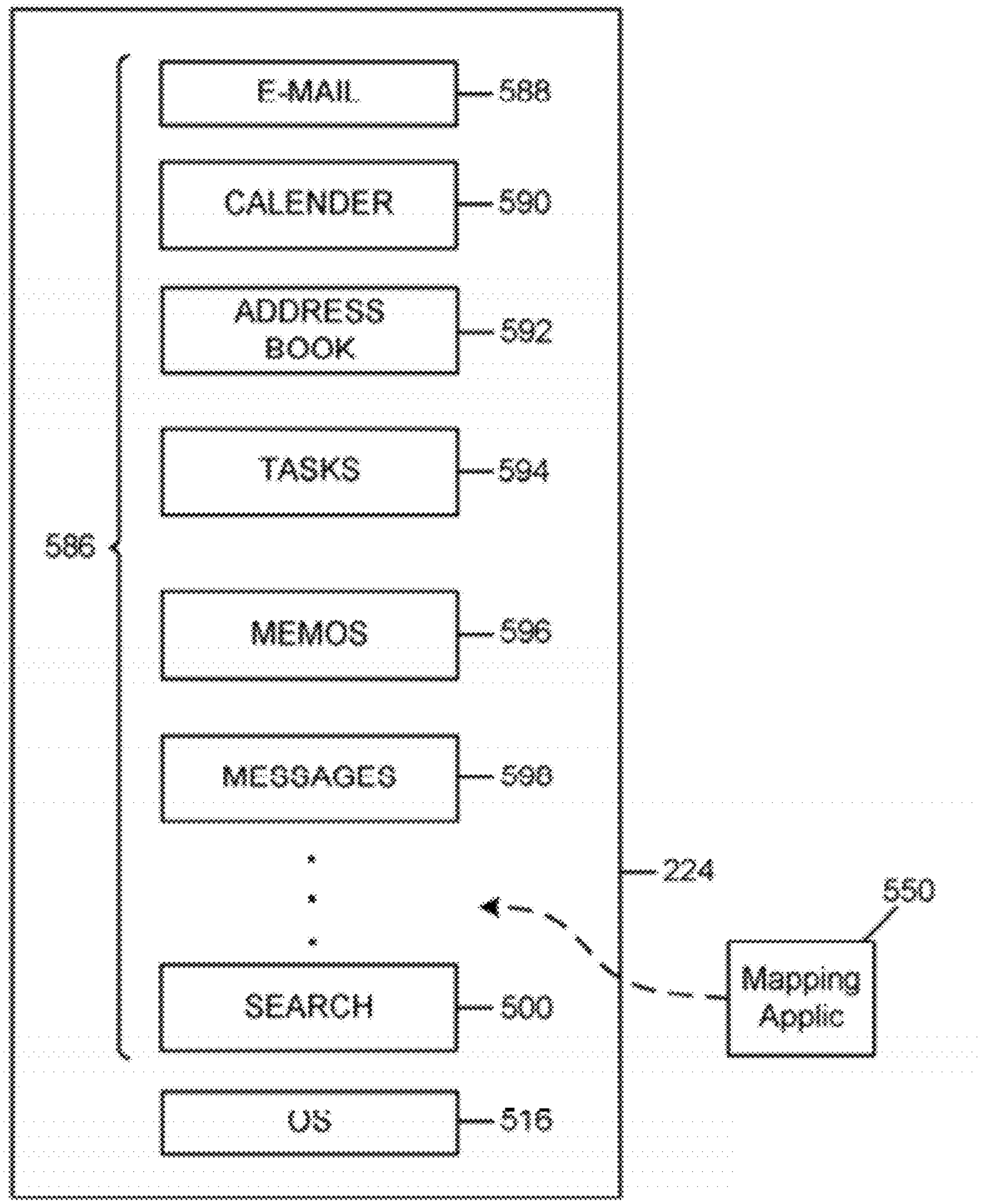
FIG. 5 is an illustration of various software applications which may reside in the mobile communication device.

As shown in FIG. 5, memory 224 includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Messages application 598 (FIG. 5) associated with Message icon 497 (FIG. 4), and a Search application 500 (FIG. 5) associated with Search icon 499 (FIG. 4). An operating system (OS) program 516 also resides in memory 224. The mobile station of the present disclosure is also adapted to render visual maps in its visual display, and utilizes a mapping application 550 stored in memory 224 to facilitate map rendering and related functionality.

In FIG. 4, the "home" screen output is currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 33 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Figure 6:
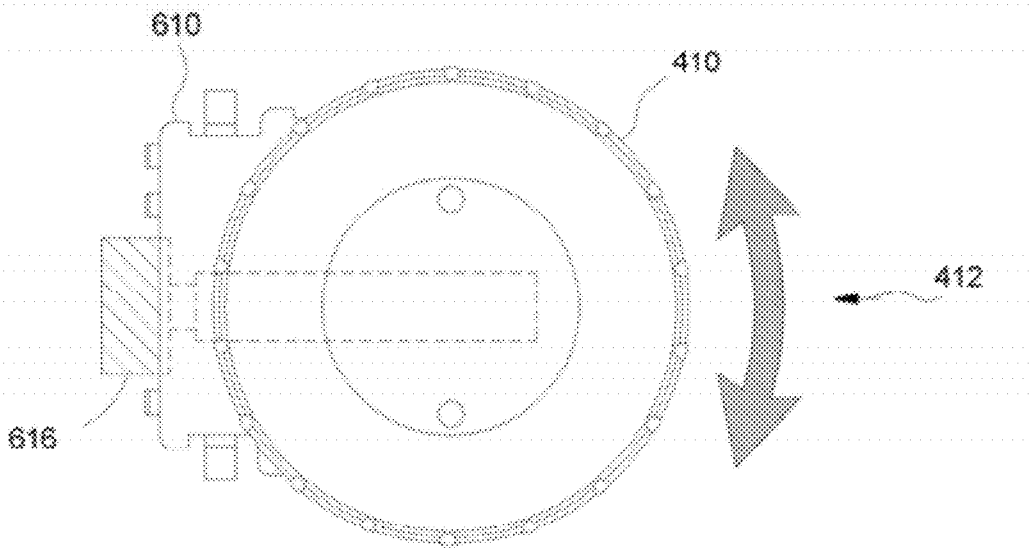
FIGS. 6 and 7 are illustrations of a positioning wheel of the mobile communication device.
Figure 7:
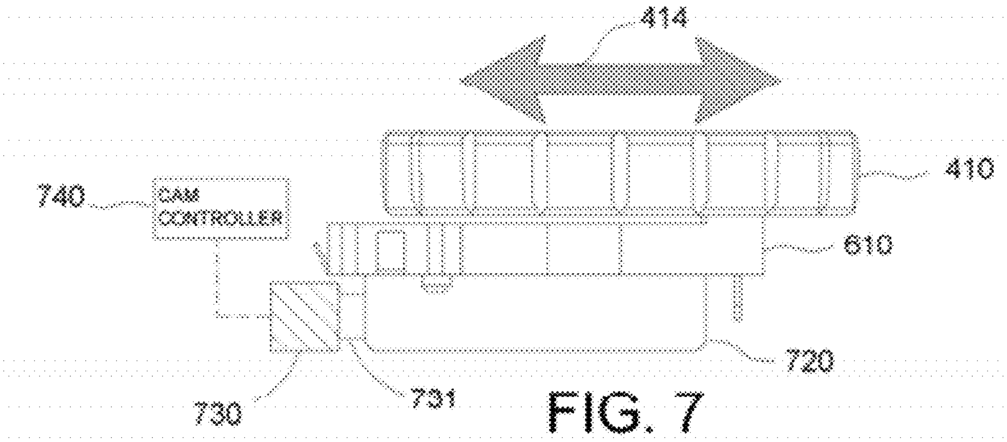

A more detailed mechanism for positioning wheel 410 is now described in relation to FIGS. 6 and 7. Positioning wheel 410 of FIGS. 6-7 is shown connected to and rotatable about a body assembly 610. Body assembly 610 may be connected to or be part of a slide assembly 720. Slide assembly 720 allows the entirety of positioning wheel 410 and body assembly 610 may move freely laterally 414 with respect to the handheld device. Lateral positioning wheel movement 414 is defined as movement along a plane normal to the rotational axis of positioning wheel 410. To control this lateral movement 414, slide assembly 720 may be connected to a control mechanism such as a cam mechanism 730 with a cam 731, or alternatively a level mechanism, a solenoid mechanism, or some other actuating means. Cam mechanism 730 is connected to a cam controller 740 responsible for controlling a lateral position of positioning wheel 410. As cam 731 connected to cam mechanism 730 and slide assembly 720 moves, positioning wheel 410 and body assembly 610 accordingly move laterally. Such lateral movement inwards toward the housing is detectable by the processor of the mobile station as a switch input (actuation or depression of the positioning wheel key).

Although positioning wheel 410 has been shown and described as one mechanism for use in navigating and moving through visually displayed information, any suitable mechanism may be utilized for the present user interface techniques, such a trackball; UP, DOWN, LEFT, and RIGHT keys; a mouse and cursor mechanism; or a touch screen display mechanism.

Figure 8:
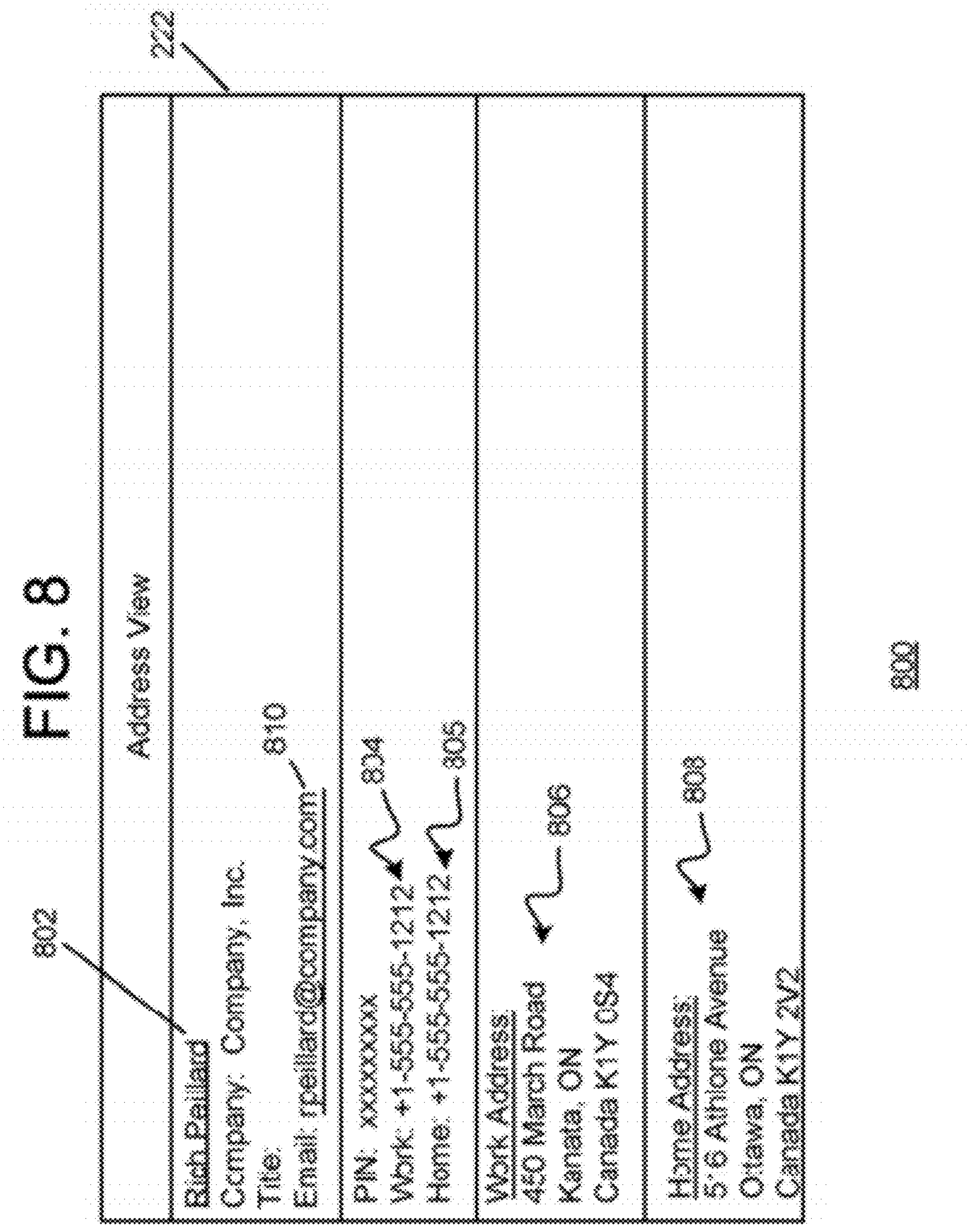
FIG. 8 is an illustration of information which may be displayed in a visual display of the mobile communication device, the information being an address book contact of an address book of the mobile communication device which contains a plurality of address book contacts.

FIG. 8 is an illustration of information which may be displayed in display 222 from use of Address book application 592 of FIG. 5. Specifically, the information in FIG. 8 is an example of address book contact information 800 of an address book for organizing a plurality of address book contacts for the end user. This address book contact information 800 may be viewable after opening the Address Book application from the homescreen page.

In the example of FIG. 8, address book contact information 800 includes an address book name 802 in an address book name field, a business or work telephone number 804 in a business or work telephone number field, a home telephone number 805 in a home telephone number field, a business or work address 806 in one or more business or work address fields, and a home address 808 in one or more home address fields. Other information may include a company name (e.g. Company, Inc.) in a company name field, a title or position of the end user in the company, and a Personal Identification Number (PIN) in a PIN field. Each address book contact of the address book has a plurality of the same fields for organizing such information. Some field of any address book contact may remain empty, depending on the end user and/or the availability of information to the end user. Additional location information for the address book contact information 800 may be included, such as a real-time location of a mobile communication device associated with the selected address book contact received through the wireless transceiver. This location may be in the form of a real-time position address or real-time latitude and longitude coordinates, and may be received substantially in real-time by the mobile communication device.

The address book application stored in the mobile station provides address book organizer functionality for the end user. The end user typically manually enters address book contact information for each contact into storage of memory for subsequent use in facilitating communications. Alternatively or additionally, address book contact information may be downloaded or otherwise received in the device in a non-manual fashion. The address book contacts may be presented (or presentable) in a list which may be alphabetized (or alphabetizable) by address book name or by other field information, or may be otherwise sorted (or sortable). Additionally, the address book contacts may be searchable by any field through use of the Search application 500 (FIG. 5). Note that the address book contact information may be stored locally in memory of the mobile station or, alternatively, outside of the mobile station such as in an accessible network database; what is important is that the address book contact information is accessible and viewable at the mobile station.

Once an address book contact has been identified or selected from the address book, the information may be used for facilitating communications for the end user. For example, as described earlier, the mobile station is adapted to operate in a wireless communication network for wireless telephony communications. Since each address book contact may have at least one telephone number field for a telephone number, this information may be used in initiating telephone calls from the mobile station. The processor of the mobile station may identify, through the user interface, a user input selection of a telephone number in the address book contact for placing a telephone call and cause the telephone call to the telephone number to be initiated through the wireless communication network in response to this user input selection. For example, the address book contact or telephone number may be selected using the positioning wheel and then a "CALL" function to the telephone number is subsequently selected via a pull down menu.

As also described earlier, the mobile station is adapted to operate in the wireless communication network for wireless message communications. Since each address book contact may have at least one electronic mail (e-mail) address field for an e-mail address, this information may be used in sending e-mail messages from the mobile station. The processor of the mobile station may identify, through the user interface, a user input selection of an e-mail address of the address book contact for sending an e-mail message and insert the e-mail address as a destination address of a new e-mail message to be delivered in response to the user input selection. For example, the address book contact or e-mail address is selected using the positioning wheel and then an "E-MAIL" function to the e-mail address is subsequently selected via a pull down menu. The end user may then type or otherwise insert the body text of the e-mail message and send it.

As mentioned earlier, the mobile station of the present disclosure is also adapted to render visual maps in its visual display. Referring back to FIG. 5, a mapping application 550 is provided in memory 224 of the mobile station for rendering of visual maps in the display. Map rendering may be performed substantially as described in relation to FIG. 3 where the mobile station sends requests for map rendering data to the network with address and/or latitude and longitude coordinates as input, subsequently receiving the map rendering data which it uses to render a map in the visual display.

Note, however, that map rendering data may be cached and maintained in memory over time. Therefore, initially, a mobile communication device may request and retrieve the map data from the network database over the wireless communication network and store the map data in the memory cache; the processor may then subsequently utilize the map data in its cache to render maps in the visual display of the device. Any map data not found within the cache (typically the case when the location or region of the map substantially changes or is different) needs to be requested and retrieved from the network database as previously described. Note that, as an alternative to the use of map rendering data or maplet data, map display may be performed by retrieving "bitmaps" of the maps and visually displaying these bitmaps corresponding to the address and/or latitude and longitude coordinates.

Figure 9:
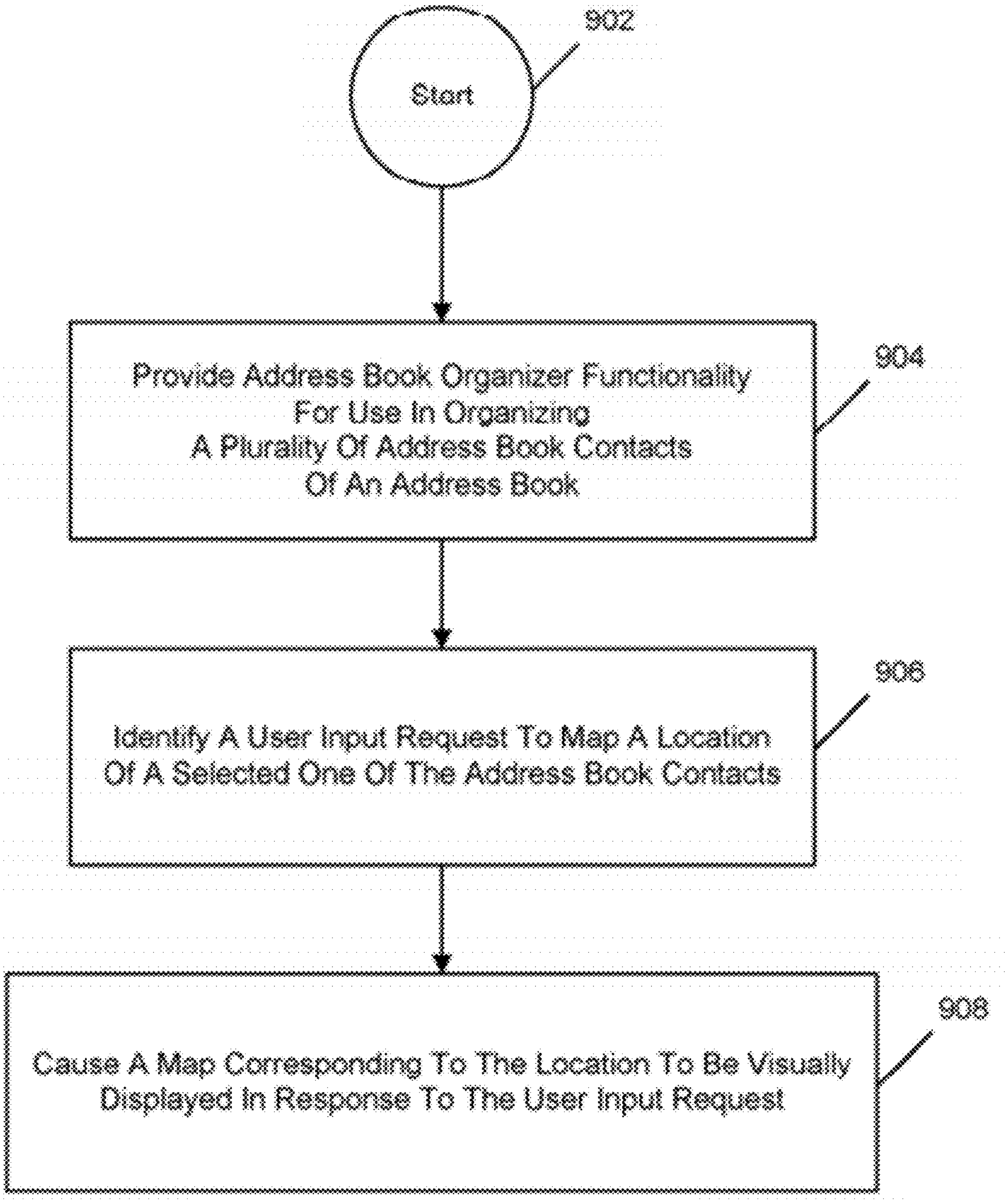
FIG. 9 is a flowchart of a method of associating mapping functionality and information in an address book, which is one specific type of contact book which may be provided.

FIG. 9 is a flowchart of a general method of providing mapping functionality and information in a contact book or list. In the example provided, the contact book is an address book as described earlier above. However, the contact book or list may be any suitable contact book or list, such as a telephone number book or list, an e-mail address book or list, or a Subscriber Identity Module (SIM) or USIM book or list. The method is performed by a mobile communication device as described in relation to the previous figures, or alternatively by any computer or communication device (e.g. a PC). The method may be executed by one or more processors of the communication device. A computer program product for the mobile station may include computer instructions stored on a computer readable medium (memory, a floppy disk or CD-ROM) which are written in accordance with the described logic of this method.

Beginning at a start block 902 of FIG. 9, an address book organizer function for use in organizing a plurality of address book contacts of an address book is provided in a mobile communication device for use in facilitating wireless communications (step 904 of FIG. 9). Again, the address book organizer function may more generally be a contact book organizer function having a plurality of contacts. The processor of the mobile communication devices then identifies, through its user interface, a user input request to map a location of a selected one of the address book contacts of the address book (step 906 of FIG. 9). Next, the processor causes a map corresponding to the location to be visually displayed in the display of the mobile communication device in response to the user input request (step 908 of FIG. 9). The mobile communication device may use its processor to map the location as described earlier in relation to, for example, FIG. 3.

Figure 10:
FIGS. 10-14 are illustrations of information which may be displayed in the visual display in a sequence of events outlined in the flowchart of FIG. 9.
Figure 11:
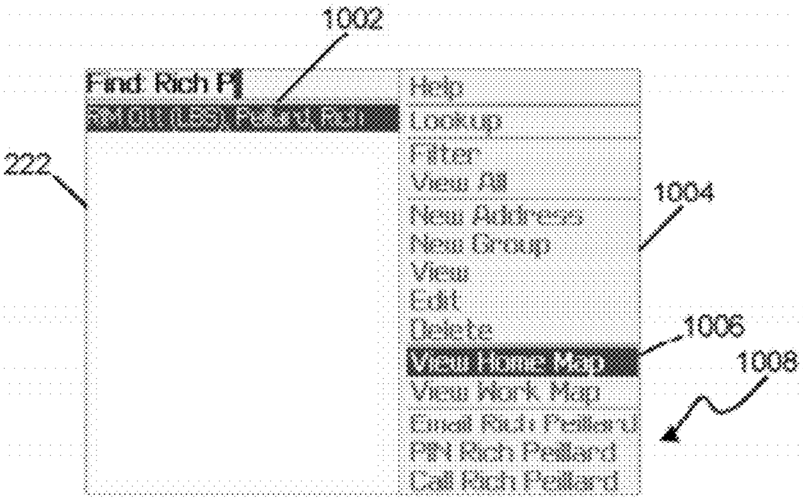

FIGS. 10-14 are example illustrations of information which may be displayed in the visual display in a specific sequence of events outlined in the flowchart of FIG. 9. FIG. 10 illustrates that the display 222 may initially show one of the plurality of address book contacts of the address book. In this example, an address book contact 1002 for a person named “Rich Peillard” is shown. Specifically, the address book name and work location is shown for the address book contact 1002 in a list provided through an address book contact search initiated by the end user. In FIG. 11, the processor detects an actuation (depression) of the positioning wheel by the end user and, in response, causes display 222 to display a pop-up or pull-down menu 1004 of functions for acting upon the selected address book contact.

As illustrated, some of the functions 1008 in pull-down menu 1004 include a “View” function for viewing the full address book contact information; an “Edit” function for editing the address book contact information; a “Delete” function for deleting the address book contact information from the address book; a “View Home Map” function for viewing a visually displayed map corresponding to the home address of the address book contact; a “View Work Map” function for viewing a visually displayed map corresponding to the work or business address of the address book contact; an “Email” function for the creation of an e-mail message with the e-mail address of the address book contact inserted as the destination address of the e-mail message; a “PIN” function for the creation of a PIN message with the PIN inserted as the destination address of the PIN address; and a “Call” function for the initiation of a telephone call to one of the telephone numbers of the address book contact.

Figure 12:

The end user uses the positioning wheel to scroll down the list of functions 1008 of pull-down menu 1004 to highlight the “View Home Map” function 1006, as shown in FIG. 11. The processor subsequently detects an actuation (depression) of the positioning wheel by the end user for selecting the highlighted “View Home Map” function 1006 for execution. In response, the processor causes the mapping application of the mobile communication device to be executed with the location of the “home” address of the selected address book contact as an input parameter. As indicated previously in relation to FIG. 8, note that home address 808 of the address book contact is “516 Athlone Avenue, Ottawa, Ontario, Canada”. In response, the processor receives map rendering data from the mapping application corresponding to home address 808 of address book contact 800. Using this map rendering data, the processor causes a map 1210 of the location of home address 808 to be visually displayed in display 222, as shown in FIG. 12. Map 1210 of FIG. 12 includes one or more address indications or labels 1202 of the home address in or around the map 1210.

Figure 13:
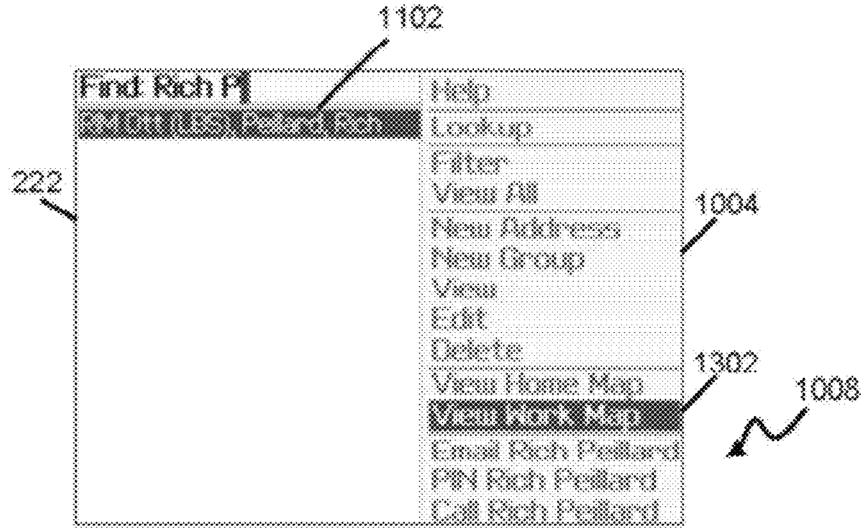
Figure 14:
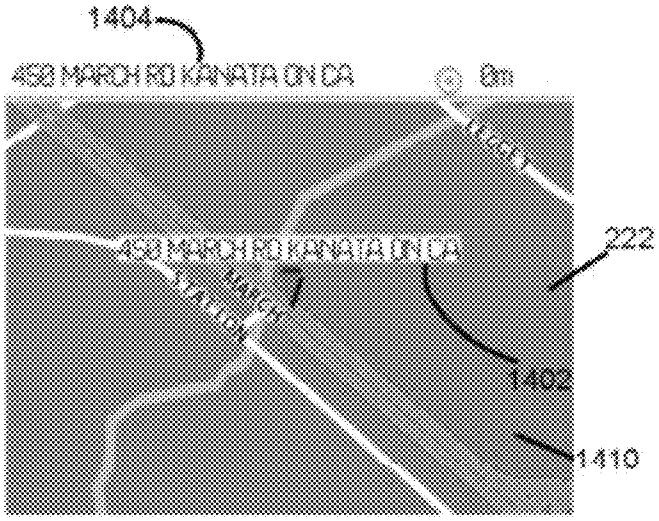

In lieu of having selected “View Home Map” function 1006 as described in relation to FIG. 11, the end user may alternatively select the “View Work Map” function. Referring now to FIG. 13, the end user uses the positioning wheel to scroll down the list of functions of pull-down menu 1004 to highlight the “View Work Map” function 1302, as shown in FIG. 13. The processor subsequently detects an actuation (depression) of the positioning wheel by the end user for selecting the highlighted “View Work Map” function 1302 for execution. In response, the processor causes the mapping application of the mobile communication device to be executed with the location of the “work” address of the selected address book contact as the input parameter. The work address is retrieved from one or more address fields the address book contact and used as the input parameter for mapping. As indicated previously in relation to FIG. 8, note that work address 806 of address book contact 800 is “450 March Road, Kanata, Ontario, Canada” as indicated previously in relation to FIG. 8. In response, the processor receives map data from the mapping application corresponding to work address 806 of address book contact 800. Using this map data, the processor causes a map 1410 of the location of work address 806 to be visually displayed in display 222, as shown in FIG. 14. Map 1410 of FIG. 14 includes one or more address indications or labels 1402 of the work address in or around the map 1410.

As described previously, additional location information for the address book contact information may be included, such as a real-time location of a mobile communication device associated with the selected address book contact received through the wireless transceiver. This location may be in the form of a real-time position address or real-time latitude and longitude coordinates, and may be received substantially in real-time by the mobile communication device. In this case, a “View Real-Time Map” function may be utilized for viewing a map corresponding to the current location of the address book contact, using similar techniques described in relation to FIGS. 8-14.

As described above, the map may be created based on an address (e.g. work or home address) in the address book contact. Additionally or alternatively, each address book contact may contain one or more location fields having location data (exposed or hidden) which may indicate the location of the address without use of the address itself. For example, the one or more location fields may contain latitude and longitude coordinates (exposed or hidden) corresponding to the location. In this case, the map may be created without any use of the address of the address book contact and instead using the latitude and longitude coordinates directly.

Preferably, according to the present disclosure, the mobile communication device may produce the map using the address of the address book contact along with an intermediary receipt and use of latitude and longitude coordinates. After receiving the user input request, the processor of the mobile communication device may identify the address in one or more address fields of the address book contact and send a request for location coordinates to an address geocoding server (e.g. described earlier in relation to FIG. 3A) via the wireless network with the address as an input. The processor receives latitude and longitude coordinates corresponding to the address/location from the address geocoding server via the wireless network in response to the request. Subsequently, the processor sends a request for map data with the latitude and longitude coordinates as an input to the map server (e.g. server 321 described earlier above) via the wireless network, and receives map rendering data in response to the request from the map server via the wireless network. The processor then causes the map corresponding to the location to be visually rendered based on the map rendering data received from the map server. As the device may utilize previously-stored map data in its cache to render maps in the visual display of the device, the subsequent request for map data may merely be made to its mapping application to retrieve the map rendering data; however any map rendering data not found within the cache (typically the case when the location or region of the map substantially changes or is different) will need to be requested and retrieved from the map server/network database as previously described.

The technique utilizing the address of the address book contact along with an intermediary receipt and use of latitude and longitude coordinates is preferred, especially in the case where maintaining compatibility of the data structure for the address book contacts is desirable, and maintaining a separation of mapping functionality is also desirable. As illustrated in relation to FIG. 8, an address book contact may not include any fields for map location (e.g. latitude and longitude coordinates), visible or otherwise. It is desirable to maintain this (existing) data structure or format without any addition of fields for mapping purposes. Thus, utilizing the above-described technique, the processor of the mobile communication device may refrain from storing latitude and longitude coordinates (or any other map/position data) in association with each address book contact. In fact, the latitude and longitude coordinates may be discarded and no longer utilized in association with the address book contact after initially rendering the map, or some short period of time thereafter. This way, the data structure for each address book contact may be maintained and memory in the mobile communication device may also be conserved. Further note that the map server (e.g. server 321) may utilize a consistent input/output protocol (e.g. input=latitude and longitude coordinates, output=map rendering data) without requiring such map server to handle requests having an address as an input. Thus, the intermediate use of the address geocoding server, for temporarily obtaining and utilizing latitude and longitude coordinate data via the wireless network, is useful.

Figure 15:
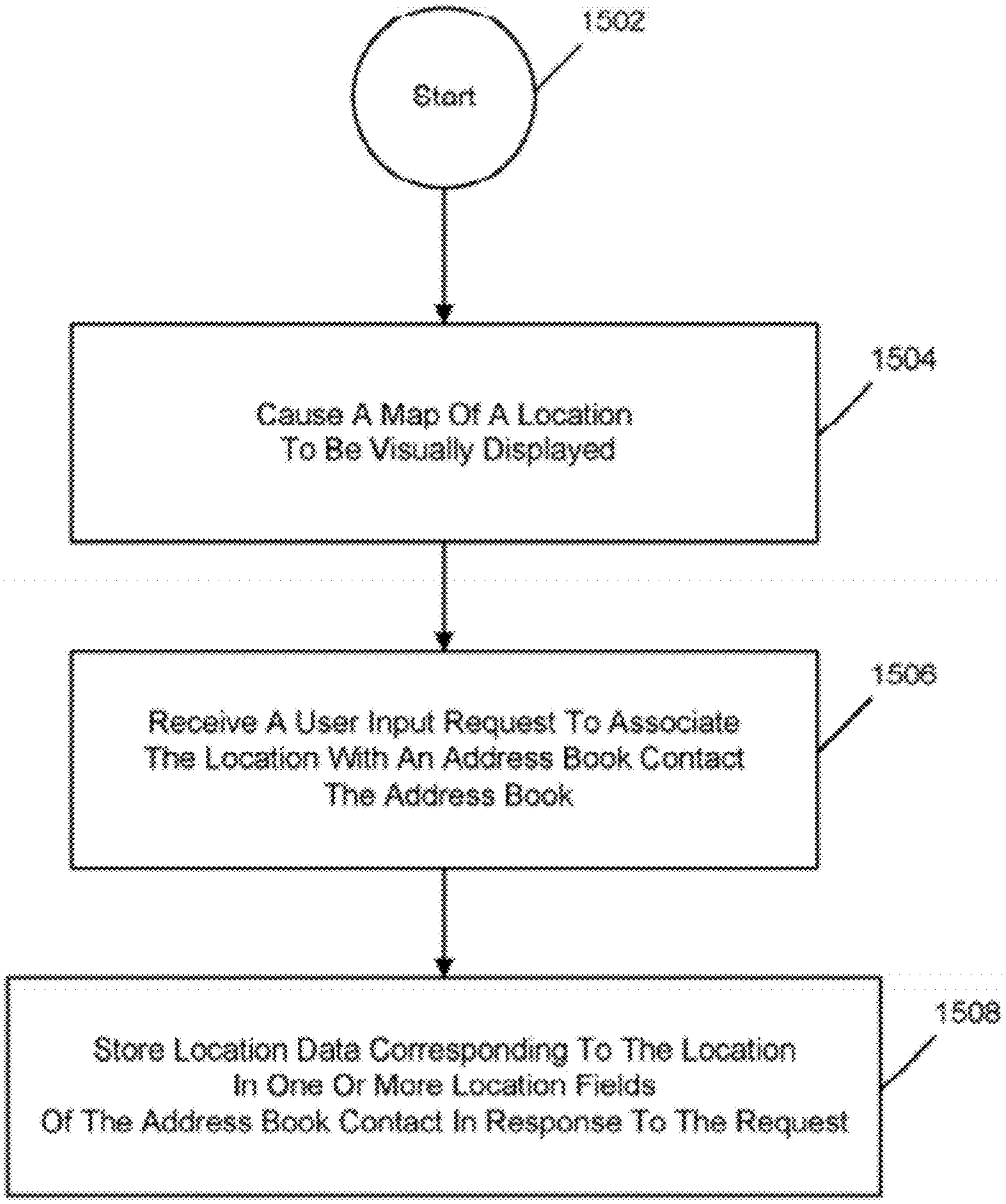
FIG. 15 is a flowchart of another method of associating mapping functionality and information in the address book.

FIG. 15 is a flowchart of another general method of associating mapping functionality and information in the contact book or list. Again, in the example provided, the contact book is an address book as described earlier above. However, the contact book or list may be any suitable contact book or list, such as a telephone number book or list, an e-mail address book or list, or a Subscriber Identity Module (SIM) or USIM book or list. The method is performed by a mobile communication device as described in relation to the previous figures, or alternatively by any computer or communication device (e.g. a PC). The method may be executed by one or more processors of the communication device. A computer program product for the mobile station may include computer instructions stored on a computer readable medium (memory, a floppy disk or CD-ROM) which are written in accordance with the described logic of this method.

Beginning at a start block 1502 of FIG. 15, the processor causes a map of a location to be visually displayed in a display of the mobile communication device (step 1504 of FIG. 15). The mapping may be performed upon a request through the user interface from the end user to map a specific location or address, or the mapping may be the real-time location of the mobile communication device which is in a mobile environment. Next, the processor receives a user input request to associate the location of the map with an address book contact in the address book of the mobile communication device (step 1506 of FIG. 15). The user input request may be part of a user input request to create a new address book contact, or part of a user input request to insert the location with an existing address book contact. In response, the processor causes location data corresponding to the location to be stored in one or more location fields of the address book contact (step 1508 of FIG. 15). Such functionality may be provided for any address book contacts within the address book, and for any possible location presented in a map.

The technique of FIG. 15 may be partially illustrated by viewing the displayed maps in relation to FIGS. 8, 11, and 12 in reverse. First, a map on the display is rendered (e.g. FIG. 12); followed by a pop-up or pull-down menu of functions, one of which includes a “Create Address Book Contact” function (e.g. FIG. 11); followed by the insertion of the location or address in the address book contact and viewing of the new/existing address book contact information (e.g. FIG. 8).

Again, in the techniques and the examples shown and described above, the contact book or list is an address book of a mobile communication device. However, the contact book or list may be any suitable contact book or list, such as a telephone number book or list, an e-mail address book or list, or a Subscriber Identity Module (SIM) or USIM book or list.

Thus, methods and apparatus for providing mapping functionality in a contact list of a mobile communication device have been described. The methods may be embodied in a computer program product comprising a computer readable medium and computer instructions stored in the computer readable medium which are executable by one or more processors. The invention may be part of a mobile communication device having a wireless transceiver; one or more processors coupled to the wireless transceiver; a user interface which includes a visual display; wherein the one or more processors are operative to execute the method.

One method of the present disclosure includes the steps of providing a contact list organizer function in a mobile communication device for use in organizing a plurality of contacts of a contact list; identifying, through a user interface of the mobile communication device, a user input request to map a location of a selected one of the contacts of the contact list; and in response to the user input request, performing the following further acts of identifying an address of the location in one or more address fields of the selected contact; sending, to an address geocoding server via wireless network, a request for location coordinates with the address as an input; receiving, via the wireless network, latitude and longitude coordinates of the location in response to the request for the location coordinates; and causing a map corresponding to the location of the selected contact to be visually rendered in a display of the mobile device based on map rendering data for the location corresponding to the latitude and longitude coordinates received via the wireless network in response to a request for map data of the location.

The contact list may be part of an address book or list having a plurality of address book contacts; a telephone book or list having a plurality of telephone numbers; an e-mail address book or list having a plurality of e-mail address; or a Subscriber Identity Module (SIM) or USIM book. As apparent, each contact may have at least one telephone number field for a telephone number. In this case, the method may include the further steps of identifying, through the user interface, a user input selection of a telephone number of a contact for placing a telephone call; and causing the telephone call to the telephone number to be initiated through a wireless communication network in response to the user input selection. On the other hand, each contact may have at least one electronic mail (e-mail) address field for an e-mail address. In this case, the method may include the further steps of identifying, through the user interface, a user input selection of an e-mail address of a contact for sending an e-mail message; and inserting the e-mail address as a destination address of the e-mail message in response to the user input selection. The location may be a pre-stored location, or a real-time location of a mobile communication device associated with the selected contact received through a wireless transceiver of the mobile communication device.

The method may also include the further steps of identifying, through the user interface, a user input selection of the selected contact or address; causing a menu of functions to be visually displayed in the display in response to the user input selection of the selected contact or address, the menu of functions including a mapping function for the selected contact or address; wherein the act of identifying the user input request comprises identifying a selection of the mapping function. The method may alternatively include the further steps of identifying, through the user interface, a user input selection of the selected contact; causing a menu of functions to be visually displayed in the display in response to the user input selection of the selected contact, the menu of functions including a mapping function for a first address and a second address of the selected contact; and wherein the act of identifying the user input request comprises identifying a selection of the mapping function for one of the first address and the second address.

In the preferred approach, the method includes the steps of identifying an address of the location in one or more address fields of the contact; sending a request for location coordinates with the address as an input to an address geocoding server via the wireless network; receiving latitude and longitude coordinates from the address geocoding server in response to the request for the location coordinates with the address as the input; sending a request for map data with the latitude and longitude coordinates as an input to a map server via the wireless network; and receiving map rendering data corresponding to the location from the map server in response to the request for the map data with the latitude and longitude coordinates as the input, wherein the act of causing the mapping corresponding to the location to be visually displayed is based on the map rendering data. If the map rendering data of the location is already cached in memory, the request for the map data is merely made to the mapping application of the mobile communication device (not to the map server via the wireless network) which retrieves it from the memory for rendering the map.

The above-described embodiments of the present disclosure are intended to be examples only. Those of skill in the art may effect alterations, modifications and variations to the particular embodiments without departing from the scope of the invention. The invention described herein in the recited claims intends to cover and embrace all suitable changes in technology.

What is claimed is:

1. A method of displaying a map in a mobile communication device having a memory storing a contact list, and a display, the method comprising:

receiving an instruction to map a location of an address of a contact in the contact list;

in response to the instruction, identifying an address of the location in one or more address fields of the contact, sending, via a wireless communication network, a request for location coordinates with the address as an input, and receiving, via the wireless communication network, geographic coordinate information of the location in response to the request for the location coordinates;

when map rendering data for the location corresponding to the geographic coordinate information is cached in the memory of the mobile communication device, causing a map for the location corresponding to the geographic coordinate information to be rendered in the display based on the map rendering data cached in the memory; and otherwise, when the map rendering data for the location corresponding to the geographic coordinate information is not cached in the memory of the mobile communication device, sending, via the wireless communication network, a request for a maplet index for map data with the geographic coordinate information of the location as input, the maplet index comprising a table of contents of available map data without the map data;

receiving, via the wireless communication network, the maplet index;

selecting, based on the maplet index, a subset of map data comprising less data than is listed in the table of contents of the maplet index for the location corresponding to the geographic coordinate information;

requesting, via the wireless communication network, based on the selecting, the subset of the map data; and causing the map with the subset of the map data to be rendered in the display.

2. The method of claim 1, further comprising:

receiving a second instruction to map a location of a second address of the contact;

in response to the user input request instruction, identifying an address of the location of the second address in one or more address fields of the selected contact, sending, via a wireless communication network, a request for location coordinates with the second address as an input, and receiving, via the wireless communication network, geographic coordinate information of the location of the second address in response to the request for the location coordinates;

when second map rendering data for the location of the second address corresponding to the geographic coordinate information is cached in the memory of the mobile communication device, causing a map for the location corresponding to the geographic coordinate information to be rendered in the display based on the second map rendering data cached in the memory; and otherwise, when the second map rendering data for the location of the second address corresponding to the geographic coordinate information is not cached in the memory of the mobile communication device, sending, via the wireless communication network, a request for map data with the geographic coordinate information of the location of the second address as input, receiving, via the wireless communication network, the second map rendering data for the location of the second address corresponding to the geographic coordinate information in response to the request for the map data, and causing the map to be rendered in the display based on the second map rendering data received via the wireless communication network in response to the request for the map data.

3. The method of claim 1, wherein the request is a request for context-filtered map data based on a user context, the user context comprising information regarding a user of the mobile communication device or a traveling speed of the mobile communication device.

4. The method of claim 2, wherein the address is designated as a home address and the second address is designated as a work address.

5. The method of claim 1, wherein the contact list is part of one of the following:

an address book or list;

a telephone book or list;

an e-mail address book or list; and a Subscriber Identity Module SIM or USIM book.

6. The method of claim 1, wherein the mobile communication device comprises a cellular telephone communicatively coupled to a cellular telecommunications network.

7. The method of claim 1, wherein the mobile communication device communicates with the map server via the wireless communication network.

8. A non-transitory computer readable medium storing computer instructions which, when executed by one or more processors of the device, cause the one or more processor to perform a method, comprising:

receiving an instruction to map a location of an address of a contact in a contact list;

in response to the instruction, identifying an address of the location in one or more address fields of the contact, sending, via a wireless communication network, a request for location coordinates with the address as an input, and receiving, via the wireless communication network, geographic coordinate information of the location in response to the request for the location coordinates;

when map rendering data for the location corresponding to the geographic coordinate information is cached in the memory of the mobile communication device, causing a map for the location corresponding to the geographic coordinate information to be rendered in the display based on the map rendering data cached in the memory; and otherwise, when the map rendering data for the location corresponding to the geographic coordinate information is not cached in the memory of the mobile communication device, sending, via the wireless communication network, a request for a maplet index for map data with the geographic coordinate information of the location as input, the maplet index comprising a table of contents of available map data without the map data;

receiving, via the wireless communication network, the maplet index;

selecting, based on the maplet index, a subset of map data comprising less data than is listed in the table of contents of the maplet index for the location corresponding to the geographic coordinate information;

requesting, via the wireless communication network, based on the selecting, the subset of the map data; and causing the map with the subset of the map data to be rendered in the display.

9. A mobile communication device, comprising:

a radio frequency (RF) transceiver operative for communications with a wireless network;

a display;

a memory storing a contact list including a plurality of contacts;

one or more processors coupled to the RF transceiver, the display, and the memory;

the one or more processors being configured to:

receive an instruction to map a location of an address of a contact in the contact list;

in response to the instruction, identify an address of the location in one or more address fields of the contact, send, via a wireless communication network, a request for location coordinates with the address as an input, and receive, via the wireless communication network, geographic coordinate information of the location in response to the request for the location coordinates;

when map rendering data for the location corresponding to the geographic coordinate information is cached in the memory of the mobile communication device, cause a map for the location corresponding to the geographic coordinate information to be rendered in the display based on the map rendering data cached in the memory; and otherwise, when the map rendering data for the location corresponding to the geographic coordinate information is not cached in the memory of the mobile communication device, send, via the wireless communication network, a request for a maplet index for map data with the geographic coordinate information of the location as input, the maplet index comprising a table of contents of available map data without the map data, receive, via the wireless communication network, the maplet index, selecting, based on the maplet index, a subset of map data comprising less data than is listed in the table of contents of the maplet index for the location corresponding to the geographic coordinate information, request, via the wireless communication network, based on the selecting of the subset, the subset of the map data, and cause the map with the subset of the map data to be rendered in the display.

10. The mobile communication device of claim 9, wherein the one or more processors are further configured to:

receive an instruction to map a location of a second address of the contact;

in response to the instruction, identify an address of the location of the second address in one or more address fields of the selected contact, send, via a wireless communication network, a request for location coordinates with the second address as an input, and receive, via the wireless communication network, geographic coordinate information of the location of the second address in response to the request for the location coordinates;

when second map rendering data for the location of the second address corresponding to the geographic coordinate information is cached in the memory of the mobile communication device, cause a map for the location corresponding to the geographic coordinate information to be rendered in the display based on the second map rendering data cached in the memory; and otherwise, when the second map rendering data for the location of the second address corresponding to the geographic coordinate information is not cached in the memory of the mobile communication device, send, via the wireless communication network, a request for map data with the geographic coordinate information of the location as of the second address input, receive, via the wireless communication network, the second map rendering data for the location of the second address corresponding to the geographic coordinate information in response to the request for the map data, and cause the map to be rendered in the display based on the second map rendering data received via the wireless communication network in response to the request for the map data.

11. The mobile communication device of claim 9, wherein the request is a request for context-filtered map data based on a user context, the user context comprising information regarding a user of the mobile communication device or a traveling speed of the mobile communication device.

12. The mobile communication device of claim 10, wherein the address is designated as a home address and the second address is designated as a work address.

13. The mobile communication device of claim 9, wherein the contact list is part of one of the following:

an address book or list;

a telephone book or list;

an e-mail address book or list; and a Subscriber Identity Module SIM or USIM book.

14. The mobile communication device of claim 7, wherein the mobile communication device comprises a cellular telephone communicatively coupled to a cellular telecommunications network.

15. A communication system, comprising:

a wireless communication network;

a map server;

a mobile communication device operative for communications in the wireless communication network;

the mobile communication device having a processor and a memory storing a contact list, and being configured to:

receive an instruction to map a location of an address of the contact in the contact list;

in response to the instruction, identify an address of the location in one or more address fields of the contact, send, via a wireless communication network, a request for location coordinates with the address as an input, and receive, via the wireless communication network, geographic coordinate information of the location in response to the request for the location coordinates;

when map rendering data for the location corresponding to the geographic coordinate information is cached in the memory of the mobile communication device, cause a map for the location corresponding to the geographic coordinate information to be rendered in the display based on the map rendering data cached in the memory; and otherwise, when the map rendering data for the location corresponding to the geographic coordinate information is not cached in the memory of the mobile communication device, send, via the wireless communication network, a request for a maplet index for map data with the geographic coordinate information of the location as input, the maplet index comprising a table of contents of available map data without the map data, receive, via the wireless communication network, the maplet index, selecting, based on the maplet index, a subset of map data comprising less data than is listed in the table of contents of the maplet index for the location corresponding to the geographic coordinate information, request, via the wireless communication network, based on the selecting of the subset, the subset of the map data, and cause the map with the subset of the map data to be rendered in the display.

16. The method of claim 1, wherein the geographic coordinate information is exposed for the contact in the at least one field of the contact list.

17. The method of claim 1, wherein the geographic coordinate information is hidden for the contact in the at least one field of the contact list.

* * * * *